United States Patent Office 2,776,892
Patented Jan. 8, 1957

2,776,892

CARBONATED BEVERAGES AND A METHOD FOR THEIR PREPARATION

Robert M. Sandri, Clifton, N. J.

No Drawing. Application June 12, 1952,
Serial No. 293,196

12 Claims. (Cl. 99—79)

This invention relates to carbonated beverages and to a method for their preparation.

It is a well known fact that carbonated beverages lose a substantial portion of their carbonation when poured, for example, from a bottle to a tumbler. Further, they rapidly lose their carbonation when left open to normal atmospheric pressure. Such loss is due to the carbon dioxide which has been dissolved under super-atmospheric pressure, coming out of solution as a gaseous phase. This loss of carbon dioxide is highly objectionable since it tends to destroy the pleasant taste of the beverages, leaving them with a flat taste. The carbonated beverage industry has long sought means for diminishing such loss with little success.

Now, it is the object of this invention to provide carbonated beverages which retain their carbonation to a higher degree when poured and lose it at a slower rate when left standing under atmospheric pressure, then those heretofore produced.

A further object of this invention is to provide a method for the production of such improved carbonated beverages which can be used in conjunction with established commercial practices in the production of such beverages.

Other objects and the various advantages provided by my invention will appear in the detailed description thereof which follows.

The carbonated beverage in accordance with this invention comprises essentially an aqueous solution of carbon dioxide which contains methyl polysilicone in amount within the range of about 0.2 to about 10.0 parts per million, by weight, and preferably an amount within the range of about 1.5 to about 5.0 parts per million, by weight, uniformly dispersed therein in the form of a colloidal phase. In addition, my carbonated beverage contains flavoring and sweetening materials, mineral salts or combinations thereof.

This invention is the result of my discovery that a minute quantity of methyl polysilicone, an opaque tasteless, non-toxic, water-insoluble gelatinous material of high viscosity, in an aqueous solution of carbon dioxide materially retards the loss of carbon dioxide from the solution when it is left standing under normal atmospheric pressure and materially diminishes the proportion of carbon dioxide lost when the beverage is, for example, poured from a bottle to a tumbler, provided the methyl polysilicone is uniformly dispersed throughout the aqueous solution in the form of a colloidal phase of fine particles of droplets.

Although the carbonated beverages in accordance with this invention retain a materially higher proportion of their original carbon dioxide after agitation under atmospheric pressure, for example, that produced by pouring from a bottle to a tumbler, than do comparable beverages not containing dispersed methyl polysilicone, they definitely foam under such agitation. The latter property is of importance, since effervescence has long been pleasantly associated in the public mind with carbonated beverages and is essential to the public acceptance of such a beverage.

The fact that methyl polysilicone is a water-insoluble gelatinous material of high viscosity renders difficult the problem of uniformly dispersing a minute quantity thereof as a colloidal phase in an aqueous liquid. As a result of my research, I have found that I can produce such a dispersion by a two-step procedure which is inexpensive and expeditious and which is the essence of the method in accordance with this invention. A third essential step in my method consists of introducing carbon dioxide, dissolved under super-atmospheric pressure, into the dilute aqueous emulsion of methyl polysilicone.

The first step of this method is to partially coat the individual particles of a flowable, non-toxic, water-soluble powdered, crystalline or granular solid with a thin film of methyl polysilicone to produce a non-agglomerated material which is still flowable. In this step, I avoid completely coating the individual particles of my water-soluble base material with methyl polysilicone to avoid rendering them insoluble in water. Further, I avoid leaving any part of the methyl polysilicone in the form of an agglomerate or agglomerates in the base material.

The product of this first step of my method forms a beverage additive which is suitable for use in the production of my improved carbonated beverages without alteration of the established procedures generally used in the beverage industry. As will be appreciated from the foregoing, this additive is a flowable solid which consists essentially of a powdered, crystalline or granular, non-toxic, water soluble solid, the individual particles of which are partially coated with a thin film of methyl polysilicone.

The non-toxic, water-soluble solid which I utilize as my base for the methyl polysilicone films is, desirably, an organic or inorganic, water-soluble solid normally contained in a food product or a natural or synthetic mineral water, and is preferably a normal component of the beverage to which my composition is to be added, or a mixture of such components. The particular water-soluble material or mixture which I use as the base material for my additive is, preferably, one which will make no significant change in the flavor of the particular beverage in which it is to be used. I may use, for example, granulated sugar, sodium chloride, sodium bicarbonate, sodium carbonate, dibasic potassium phosphate, anhydrous citric acid or any mixture thereof as a water-soluble base material in my additive composition.

My additive composition is a stable product which may be stored for relatively long periods of time. It may be produced in the beverage bottling plant in which it is used or it may be produced in an entirely separate operation and furnished to beverage bottling plants as a raw material.

I produce this additive composition by mixing a predetermined quantity of methyl polysilicone into the powdered, crystalline or granulated water-soluble base material in an operation in which the ingredients are both thoroughly mixed and subjected to mechanical rubbing force. I have found that this mixing step may be carried out in the laboratory by mixing and triturating the ingredients by the use of a mortar and pestle, or by mixing and grinding them together in a ball mill. It may be carried out on a larger scale by the use of a ball mill or other mechanical mixing device which applies force in a similar manner to the ingredients being mixed.

The relative proportions of the methyl polysilicone and of the base material which I use in this step is of critical importance in securing my additive product. The maximum percentage of methyl polysilicone which I utilize must be below that which will completely coat the water-soluble particles of my base material rendering them insoluble in water or which will cause them to be non-flowable. This percentage varies with the particle size of the base material but, in general, I find that a practical maximum is about 10 percent, by weight, of the methyl polysilicone, based on the weight of the remainder of the composition. I have found, for example, that when using granulated sugar as a base material, that 11 percent, by weight, of methyl polysilicone, based on the weight of the sugar, when thoroughly dispersed in the sugar, produces a product which is, at least, partially insoluble in water and which does not have the requisite flowability.

There is no inherent minimum limitation imposed on the percentage of methyl polysilicone which I use in my additive. However, an important practical limitation is imposed from the standpoint of inconvenience and cost involved in handling an unnecessary bulk of material and of avoiding the adjustment of more or less standardized formulations of beverage syrups or mineral salt mixtures, to compensate for the added base material. I have found that about 0.1 percent of methyl polysilicone, based on the weight of my base material is a practical minimum limitation.

Thus, my research has demonstrated that, in general, the amount of methyl polysilicone used in my additive composition must be within the range of about 0.1 percent to about 10 percent of the base material and I have found that from the standpoint of practical operation, I prefer to use an amount of the methyl polysilicone within the range of about 3 percent to about 7 percent, by weight, of methyl polysilicone based on the weight of my water-soluble base material.

The application of mechanical force in the mixing of my ingredients in this first step of my method is, likewise, of critical importance. As will be appreciated from the types of mixing which I may use, the methyl polysilicone is both uniformly dispersed throughout the mass of particles of the base material, and actually rubbed onto the surface of the individual particles as thin films partially coating the surfaces of the individual particles by the forceful rubbing action effected in the mixing operation.

I have found that this additive cannot be produced by simple stirring or tumbling, even when the ingredients are in proportions within the above stated ranges, since neither technique results in a flowable product composed of particles of the base material only partially coated with methyl polysilicone. Either simple stirring or tumbling produces a product containing agglomerated masses of methyl polysilicone and the base material and uncoated particles of base material which are useless for my purpose.

In carrying out this first step of my method, I continue the mixing with mechanical rubbing force until no globules of methyl polysilicone are visible upon ordinary visual inspection and I prefer to extend it to a point such that no separate droplets are visible under a high-powered microscope. I have found, however, that the presence of a small percentage of the methyl polysilicone in the presence of free microscopic droplets in my completed additive does no material harm, although my research has indicated that the portion of methyl polysilicone in such form, rather than in a film on the particles of base material, has little or no effect in my completed carbonated beverage and, hence, is wasted.

The second step of my method consists of suspending the additive produced in its first step in an aqueous liquid in a manner such that the individually coated particles of the additive are dispersed in the aqueous liquid and separated from each other by the liquid, before the water-soluble base material of the particles have an opportunity to dissolve in the liquid.

In carrying out this step, I introduce my additive material into the aqueous liquid while it is being subjected to vigorous agitation. I mechanically disperse the coated particles before they enter the surface of the aqueous liquid and continue its agitation until the base material of my additive has dissolved therein, leaving the methyl polysilicone dispersed therein as an undissolved, emulsified phase uniformly suspended throughout the aqueous solution.

The completeness with which I mechanically disperse the coated particles of my additive before they come into contact with the aqueous liquid is determined by the rate at which the water-soluble base material of the additive dissolves in the aqueous liquid. In situations in which the base material dissolves at a relatively slow rate in the aqueous liquid or is dispersed therein with high efficiency, the additive may be introduced in the agitated aqueous liquid by simply shaking it over the surface of the aqueous liquid from a shaker top bottle. On the other hand, it is desirable to substantially completely separate the individual particles of my additive in air before they come into contact with the surface of the agitated liquid, in situations in which the base material dissolves rapidly in the aqueous liquid or is inefficiently dispersed therein by its agitation. I have found that I can secure the necessary preliminary separation of the particles of the additive by the use of one of the several pneumatic or centrifugal devices which have been developed for the dispersion of solid particles in a gaseous medium.

In introducing a beverage additive in which the water-soluble base material is largely cane sugar, for example, that exemplified by Examples I, II, and III given below, into a finished beverage flavor syrup containing a high proportion of sugar, it may be shaken over the top of the flavor syrup from a shaker top bottle while the beverage syrup is being agitated. Finished beverage flavor syrups are relatively viscous and usually have a density within the range of about 25 to about 36 degrees Baumé. Their high content of dissolved sugar tends to retard the rate at which the water soluble base material of my additive dissolves and the high viscosity of the solution renders it efficient in separating the individual particles of the additive from each other before the base material dissolves.

On the other hand, in introducing a beverage additive which has a water-soluble base material which dissolves rapidly in the aqueous medium, for example, when introducing that illustrated by the Examples I, II, III, into a beverage mixture which is complete except as to its carbonation, I must use precautions to secure a good separation of the particles of the additive before they enter the aqueous liquid.

In this second step of my method, the solution of the water-soluble base of my additive leaves the methyl polysilicone which was in a film on its individual particles suspended as a colloidal phase in the solution. The separation of the individual particles of the additive prior to the solution of the water-soluble base is essential to secure an effective dispersion of the methyl polysilicone. When the particles are not separated before the base dissolves, the methyl polysilicone agglomerates and rises to the surface of the liquid, and becomes ineffective in the retention of carbonation in the liquid.

The third step of my method consists of introducing carbon dioxide, dissolved under super-atmospheric pressure, into the dilute aqueous emulsion of methyl polysilicone resulting from the two preceding steps. This may be done by diluting the emulsion with water which carries dissolved carbon dioxide, or by dissolving the carbon dioxide directly in the dilute aqueous emulsion of methyl polysilicone. The amount of carbon dioxide which is introduced into the emulsion depends upon the particular ingredients which are dissolved in its aqueous phase, i. e. upon the particular type of carbonated beverage I am producing. In the production of soda pops, I dissolve about 2 to 2½ volumes of carbon dioxide in the emulsion, while in the case of ginger ales, cola drinks, club sodas, or seltzer water and synthetic mineral waters, I ordinarily use about 4 to 4½ volumes of carbon dioxide.

Beverage botting plants, in general, follow one of two alternative procedures in their operations. In the older and more usual procedure, a solution of carbon dioxide in water is mixed with a concentrated aqueous solution of the other ingredients of the beverage. In a more recent procedure, usually referred to as pre-mix bottling, a beverage mixture is prepared which is complete except as to its carbonation and then carbon dioxide is dissolved, under super-atmospheric pressure, directly in this mixture.

As already stated, the first step of my method in which I produce my additive material may be carried out in the beverage bottling plant or it may be produced in a separate operation and furnished in completed form to the beverage plant. In any case, its production is not a part of the normal operations of such a plant. The second and third steps of my method are carried out in the beverage bottling plant and require no special equipment or alteration of the normal procedures of such plants.

In beverage bottling plants which follow the first of the above mentioned alternative procedures, a finished flavor syrup is agitated in a flavor reservoir tank, passed through a cooler and fed in metered quantities to beverage bottles which are only partially filled thereby. These partially filled bottles are then substantially completely filled with a solution of carbon dioxide in substantially pure water, produced by a device known as a carbonator, capped, and agitated to disperse the flavor syrup in the aqueous solution of carbon dioxide and cause the contents of the bottle to become uniform. In such a plant, a batch of flavor syrup is ordinarily placed in the flavor reservoir and completely used before the reservoir is refilled.

In a bottling plant utilizing this procedure, I introduce a calculated quantity of my additive composition into the finished flavor syrup while it is being agitated in the flavor reservoir, for example, by shaking it out of a bottle having a shaker top, and continue the agitation of the syrup until the base material of my additive has dissolved in the syrup. I prefer, then, to continue the agitation of the syrup as it is being drained from the reservoir to be fed to the bottles.

Beverage plants using the pre-mix bottling procedure may mix a large volume of the beverage in a large tank, which is complete except for its carbonation, pass it through a carbonator and on to the bottles. Alternatively, the beverage syrup and water required are automatically measured by a continuous metering system, mixed, cooled, carbonated, and finally bottled.

In such plants, I may add my beverage additive to the finished flavor syrup, or to a minor portion thereof which is then admixed with the remainder of the flavor syrup, following the same procedure described hereinbefore in connection with the alternative plant procedure. In such plants in which a large volume of the beverage mixture, complete except for its carbonation, is prepared in a large tank, I may add my additive to each batch prepared in the tank, while using care to see that its individual particles are separated by air before they enter the surface of the beverage mix, while it is being agitated.

Regardless of the particular plant procedure involved, or the particular alternative I follow in introducing my additive into the beverage mix, the quantity of additive which I utilize is calculated to yield an amount of methyl polysilicone in the final beverage within the range of about 0.2 to about 10.0 parts per million by weight, on the basis of the percent of the methyl polysilicone contained in the additive composition itself. The following examples illustrate specific embodiments of the carbonated beverages, of the additive compositions used in the production of such beverages, and of the method in accordance with this invention.

*Example I.—Additive for fruit flavored soda*

A beverage additive composition which is effective and satisfactory for use in carbonated beverages made from sugar based syrups having a wide variety of flavors has the following composition:

|  | Grams |
|---|---|
| Methyl polysilicone | 6.5 |
| Granulated cane sugar | 132.2 |
| Sodium chloride | 1.0 |
| Citric acid (anhydrous) | 2.0 |
| Total | 141.7 |

The additive is prepared by mixing and thoroughly triturating the above listed ingredients in a mortar with a pestle until no droplets of methyl polysilicone are visible under a microscope.

This additive mixture will give a concentration of 2 parts per million of emulsified methyl polysilicone in 325 cases carrying twelve 28-ounce bottles or a total of 3900 bottles or 109,200 fluid ounces of completed beverage.

In the second step of my method, I add the above composition to 125 gallons of flavor syrup while it is being agitated. The resulting emulsion is then metered into bottles, 4 ounces to a 28-ounce bottle, and then, as the third step of my method, the bottle is filled to capacity with an aqueous solution of carbon dioxide which has been prepared by dissolving gaseous carbon dioxide in substantially pure water. When my flavor syrup is that of a fruit flavored soda, I use an aqueous solution of carbon dioxide carrying 2 to 2.5 volumes of carbon dioxide. If it is a cola drink syrup or a ginger ale syrup, I use an aqueous solution of carbon dioxide carrying 4 to 4½ volumes of dissolved carbon dioxide. The finished beverage carries 2 parts per million, by weight, of emulsified methyl polysilicone.

*Example II.—Orange soda*

The following composition is thoroughly admixed and triturated with a mortar and pestle:

|  | Grams |
|---|---|
| Methyl polysilicone | 4.62 |
| Granulated sugar | 90.0 |
| Citric acid (anhydrous) | 10.0 |
| Sodium chloride | 0.5 |
| Total | 105.12 |

This operation produces an additive composition which is suitable for use with a variety of finished flavor syrups.

I may add it by sprinkling, to an agitated orange soda flavor syrup having the following composition:

| | |
|---|---|
| Simple sugar syrup (32° Baumé) gallons | 100 |
| Citric acid (50% by weight aqueous solution) fluid ounces | 150 |
| Orange soda water flavor do | 384 |

This admixture results in a dilute aqueous emulsion of methyl polysilicone, which carries the remaining ingredients in solution in its aqueous phase.

I prepare my final beverage by adding 4.5 fluid ounces of this emulsion to 28-ounce bottles and fill them to capacity with a solution of 2.5 volumes of gaseous carbon dioxide dissolved in substantially pure water, to produce an orange soda containing 2 parts per million, by weight, of emulsified methyl polysilicone.

The foregoing quantities of additive and flavor syrup are sufficient to produce 232 cases, each containing twelve 28-ounce bottles or a total of 77,952 fluid ounces of the carbonated beverage.

*Example III—Pale dry ginger ale*

The following composition is thoroughly admixed with the application of mechanical force by grinding in a ball mill:

|  | Grams |
|---|---|
| Methyl polysilicone | 5.22 |
| Granulated sugar | 120.0 |
| Citric acid (anhydrous) | 2.0 |
| Sodium chloride | 1.0 |
| Total | 128.22 |

This additive composition is suitable for the production of a pale dry ginger ale in accordance with this invention.

To produce such a ginger ale, in the second step of the method in accordance with my invention, I shake the foregoing additive mixture into an agitated pale dry ginger ale flavor syrup having the following composition:

| | |
|---|---|
| Simple sugar syrup (26° Baumé) _____ gallons__ | 100 |
| Citric acid (50% aqueous solution) __ fluid ounces__ | 225 |
| Ginger ale soda water flavor _____ do____ | 225 |

I meter 4.5 fluid ounces of the resulting dilute methyl polysilicone emulsion into a beverage bottle having a capacity of 28 ounces and then fill the bottle to capacity with a solution of 4 volumes of gaseous carbon dioxide in substantially pure water, cap the bottle, and agitate it, to complete the third step of my method.

The total quantities of additive and flavor syrup given above are sufficient to produce 260 cases, carrying 12 bottles of 28-ounce capacity or a total of 87,630 fluid ounces of pale dry ginger ale containing two parts per million, by weight, of emulsified methyl polysilicone.

*Example IV.—Club soda*

To prepare a club soda, alternately termed seltzer water, vichy water, or sometimes simply carbonated water, I mix and triturate the following ingredients by the use of a mortar and pestle:

| | Grams |
|---|---|
| Methyl polysilicone | 1.56 |
| Hydrated dibasic potassium phosphate ($KH_2PO_4 \cdot 7H_2O$) | 52.5 |
| Sodium carbonate | 270.0 |
| Sodium chloride | 105.0 |
| Total | 429.06 |

This additive composition is then dispersed in air to separate the individual particles as it is added to fifteen gallons of substantially pure water which is being vigorously agitated. The resulting dilute emulsion of methyl polysilicone containing the inorganic salts in solution in its aqueous phase is a concentrate for use in the production of club soda.

Two ounces of this concentrated solution is used in the preparation of 28 ounces of club soda. This amount of the solution may be added to a 28-ounce bottle and the bottle filled to capacity with a solution of 4.5 volumes of carbon dioxide in substantially pure water and capped. Alternatively, the club soda may be prepared by either of the pre-mix procedures described hereinbefore, by diluting the 15 gallon concentrate to a total volume of 26,208 ounces, either batch-wise or in a continuous metering system, and then carbonated by dissolving 4.5 volumes of carbon dioxide in each volume of the diluted solution emulsion.

Wide variations can be made in the composition of the water-soluble base which I use for methyl polysilicone in the preparation of my additive composition, as will be fully appreciated from a comparison of the composition of the additive illustrated by Example IV with those illustrated by Examples I, II, and III. This comparison also illustrates the correlation which I prefer to make between the particular materials which I have chosen as the water-soluble base for my additive composition and the composition of the particular type of beverage in which it is to be used.

A comparison of the compositions of the embodiments of my additive compositions illustrated by Examples I, II, and III more specifically illustrates, in their variations of the relative proportions of sugar, citric acid and sodium chloride, the close correlation which I prefer to make between the composition of the water-soluble base and the particular beverage in which it is to be used. Such correlation is made on the basis of the effect of those ingredients on the flavor of the finished beverage.

Also, I prefer to choose the particular ingredient or ingredients which I use as the water-soluble base for my additive compositions to secure optimum physical properties, particularly flowability, in the completed additive composition. For example, my additive composition may be a binary mixture of methyl polysilicone and granulated sugar, and such an additive is satisfactory for use in any carbonated beverage which contains sugar in its composition. However, I have found that the addition of anhydrous citric acid and sodium chloride improves the flowability of the additive composition.

Thus, it will be appreciated that I prefer to correlate the composition of the water-soluble base of my additive composition, both with that of the particular type of carbonated beverage which I prepare, and with the physical properties of the additive. This preferred double correlation can be further illustrated. Binary mixtures of methyl polysilicone with either anhydrous citric acid or sodium chloride are satisfactory from the standpoint of flowability and of producing a satisfactory emulsion of the methyl polysilicone in the second step of the method in accordance with my invention. However, each of these materials, particularly sodium chloride, have a strong effect on the flavor of the completed beverage, and are less satisfactory than the more complex mixtures illustrated by the foregoing examples for addition to the more usual types of carbonated beverages, from the standpoint of the care with which they must be used to avoid distortion of the flavor of the final beverage. Thus, in a formulation for use in a variety of fruit flavored beverages, I ordinarily prefer not to use more than about 1.5 percent, by weight, of sodium chloride.

The extent to which my additive retards the loss of carbonation from an open carbonated beverage varies with the amount, in terms of its actual methyl polysilicone content, which is added to the beverage, the temperature and other physical conditions under which the beverage is allowed to stand and possibly other less obvious variables. However, I have found by direct comparisons between bottles of carbonated beverages containing no methyl polysilicone and beverages which are identical except in that they contain methyl polysilicone added by the product in accordance with this invention to the extent of two parts per million, that after standing twenty-four hours in an uncapped bottle at normal room temperatures, the beverages containing the dispersed methyl polysilicone retained from 20 to 40 percent more carbonation, than those which contained no methyl polysilicone.

What I claim and desire to protect by Letters Patent is:

1. A carbonated beverage comprising essentially an aqueous solution of carbon dioxide having an amount of methyl polysilicone within the range of about 0.2 part to about 10.0 parts per million, by weight of the solution, uniformly dispersed therein as an emulsified phase.

2. A carbonated beverage comprising essentially an aqueous solution of carbon dioxide having an amount of methyl polysilicone within the range of about 1.5 parts to about 5.0 parts per million, by weight of the solution, uniformly dispersed therein as an emulsified phase.

3. A carbonated beverage comprising essentially an aqueous solution of carbon dioxide, a sweetening agent and a flavoring material having an amount of methyl polysilicone within the range of about 0.2 part to about 10.0 parts per million, by weight of the solution, uniformly dispersed therein as an emulsified phase.

4. A carbonated beverage comprising essentially an aqueous solution of carbon dioxide and non-toxic inorganic salts having an amount of methyl polysilicone within the range of about 0.2 part to about 10.0 parts per million, by weight of the solution, uniformly dispersed therein as an emulsified phase.

5. A method for the production of a carbonated beverage which comprises the successive steps of partially coating individual particles of a non-toxic, water-soluble solid with methyl polysilicone to produce a flowable mixture by mixing the solid particles, with the application of a mechanical rubbing force, with an amount of methyl polysilicone within the range about 0.1 percent to about 10 percent, by weight, of the solid particles, of dispersing the individual coated particles in an aqueous medium, of dissolving the non-toxic, water-soluble solid in the water to produce an aqueous solution containing the methyl polysilicone as a uniformly dispersed, emulsified phase, and of adding carbon dioxide to the said aqueous emulsion.

6. A method for the production of a carbonated beverage which comprises the successive steps of partially coating individual particles of a non-toxic, water-soluble solid with methyl polysilicone to produce a flowable mixture by mixing the solid particles, with the application of a mechanical rubbing force, with an amount of methyl polysilicone within the range of about 0.1 percent to about 10 percent, by weight, of the solid particles, of dispersing the individual coated particles in a viscous aqueous solution, of dissolving the non-toxic, water-soluble solid in the water thereof to produce a viscous aqueous solution containing the methyl polysilicone as a uniformly dispersed emulsified phase, of diluting the resulting viscous aqueous solution by the addition of substantially pure water containing gaseous carbon dioxide dissolved therein under super-atmospheric pressure.

7. A method for the production of a carbonated beverage which comprises the successive steps of partially coating the individual particles of a non-toxic, water-soluble mixture of solids comprising essentially granulated sugar with methyl polysilicone to produce a flowable mixture by mixing the solid particles, with the application of mechanical rubbing force, with an amount of methyl polysilicone within the range of about 0.1 percent to about 10 percent, by weight of the individual coated particles, dispersing the individual coated particles in an aqueous flavor syrup containing sugar and a flavoring material and having a density within the range of about 25 to about 36 degrees Baumé, of dissolving the water-soluble particles in the flavor syrup to produce an aqueous solution containing the methyl polysilicone as a uniformly dispersed, emulsified phase, of diluting the resulting viscous aqueous solution by the addition of substantially pure water containing carbon dioxide dissolved therein, under super-atmospheric pressure.

8. A club soda comprising essentially an aqueous solution of carbon dioxide, dibasic potassium phosphate, sodium carbonate and sodium chloride having an amount of methyl polysilicone within the range of about 0.2 part to about 10.0 parts per million, by weight, of the solution, uniformly dispersed therein as an emulsified phase.

9. A fruit flavored soda comprising essentially an aqueous solution of carbon dioxide, sugar, sodium chloride, citric acid and a fruit flavor, having an amount of methyl polysilicone within the range of about 0.2 part to about 10.0 parts per million uniformly dispersed therein as an emulsified phase.

10. A ginger ale comprising essentially an aqueous solution of carbon dioxide, sugar, sodium chloride, citric acid and a ginger ale flavor, having an amount of methyl polysilicone within the range of about 0.2 part to about 10.0 parts per million uniformly dispersed therein as an emulsified phase.

11. A method for the production of a carbonated beverage which comprises the steps of partially coating the individual particles of a mixture of granulated cane sugar, sodium chloride and citric acid with methyl polysilicone to produce a flowable mixture by mixing the solid particles, with the application of a mechanical rubbing force, with an amount of methyl polysilicone within the range of about 0.1 percent to about 10.0 percent, by weight, of the solid particles; of dissolving the said mixture in an aqueous solution of a sugar citric acid and a flavoring material; and of diluting the resulting aqueous solution containing emulsified methyl polysilicone by the addition of substantially pure water having gaseous carbon dioxide dissolved therein under superatmospheric pressure to produce a solution having an amount of methyl polysilicone within the range of about 0.2 part to about 10.0 parts per million, by weight, of the solution, uniformly dispersed therein as an emulsified phase.

12. A method for the production of a club soda which comprises the steps of partially coating the individual particles of a mixture of dibasic potassium phosphate, sodium carbonate and sodium chloride to produce a flowable mixture by mixing the solid particles, with the application of a mechanical rubbing force with an amount of methyl polysilicone within the range of about 0.1 percent to about 10.0 percent, by weight, of the solid particles; of dissolving this mixture in substantially pure water to produce a concentrated solution of the said salts having methyl polysilicone dispersed therein, and of dissolving the said concentrate in substantially pure water having gaseous carbon dioxide dissolved therein under superatmospheric pressure to produce a solution having an amount of methyl polysilicone within the range of about 0.2 part to about 10.0 parts per million, by weight, of the solution, uniformly dispersed therein as an emulsified phase.

References Cited in the file of this patent

UNITED STATES PATENTS

| | | |
|---|---|---|
| 2,375,007 | Larsen | May 1, 1945 |
| 2,474,704 | Thayer | June 28, 1949 |
| 2,635,981 | Austin et al. | Apr. 21, 1953 |